United States Patent
Binns et al.

(10) Patent No.: US 7,249,040 B1
(45) Date of Patent: Jul. 24, 2007

(54) COMPUTERIZED MEDICAL UNDERWRITING OF GROUP LIFE AND DISABILITY INSURANCE USING MEDICAL CLAIMS DATA

(75) Inventors: Gregory S. Binns, Lake Forest, IL (US); Mark Stuart Blumberg, Oakland, CA (US)

(73) Assignee: TruRisk, L.L.C., Lake Forest, IL (US)

( * ) Notice: Subject to any disclaimer, the term of this patent is extended or adjusted under 35 U.S.C. 154(b) by 0 days.

(21) Appl. No.: 11/377,059

(22) Filed: Mar. 16, 2006

(51) Int. Cl.
*G06Q 10/00* (2006.01)
(52) U.S. Cl. .................................. 705/4; 705/2; 705/3
(58) Field of Classification Search ................ 705/2–4, 705/35, 26, 38
See application file for complete search history.

(56) References Cited

U.S. PATENT DOCUMENTS

| | | | |
|---|---|---|---|
| 4,667,292 A | 5/1987 | Mohlenbrock et al. | |
| 4,750,121 A | * 6/1988 | Halley et al. | ................. 705/35 |
| 4,975,840 A | 12/1990 | DeTore et al. | |
| 5,018,067 A | 5/1991 | Mohlenbrock et al. | |
| 5,544,044 A | 8/1996 | Leatherman | |
| 5,557,514 A | 9/1996 | Seare et al. | |
| 5,613,072 A | 3/1997 | Hammond et al. | |
| 5,652,842 A | 7/1997 | Siegrist, Jr. et al. | |
| 5,712,984 A | 1/1998 | Hammond et al. | |
| 5,724,379 A | 3/1998 | Perkins et al. | |
| 5,754,980 A | * 5/1998 | Anderson et al. | .............. 705/4 |
| 5,809,478 A | 9/1998 | Greco et al. | |
| 5,835,897 A | 11/1998 | Dang | |
| 5,873,066 A | 2/1999 | Underwood et al. | |

(Continued)

FOREIGN PATENT DOCUMENTS

JP  2002-049745  * 8/2000

OTHER PUBLICATIONS

"Using Claims Data to Examine Mortality Trends Following Hospitalization for Heart Attack in Medicare" by Ash et al.; Health Services Research, Oct. 2003 (38) 5: 1253-1262.*

(Continued)

*Primary Examiner*—Alexander Kalinowski
*Assistant Examiner*—Vivek Koppikar
(74) *Attorney, Agent, or Firm*—Welsh & Katz, Ltd.

(57) ABSTRACT

A method of underwriting group disability insurance for a policy period includes collecting medical claims data for the group to be underwritten, where each medical claim being related to a particular employee of the group. Morbidity categories are provided that categorize the medical claims in the medical claims data. A conditional probability model is developed and applied to the morbidity categories for each employee in the group using his medical claims, thereby calculating the expected conditional probability for each employee of incurring a disability during the policy period. A further statistical model of the estimated cost of the disability is developed and applied based on the employees' morbidity categories from the medical claims data. For each employee, an estimate of the expected cost of incurring a disability given their morbidity categories is derived from his medical claims data. Combining the expected conditional probability for each employee incurring a disability during the policy period with the estimate of the expected cost of that disability gives an estimate of the group's total disability exposure. Thereby, the expected disability exposure is used to determine a premium amount for disability insurance coverage during the policy period for the group.

6 Claims, 5 Drawing Sheets

U.S. PATENT DOCUMENTS

| | | | |
|---|---|---|---|
| 5,893,072 | A | 4/1999 | Zizziamia et al. |
| 5,918,208 | A | 6/1999 | Javitt et al. |
| 5,970,464 | A | 10/1999 | Apte et al. |
| 5,976,082 | A | 11/1999 | Wong et al. |
| 6,061,657 | A | 5/2000 | Whiting-O'Keefe |
| 6,078,890 | A | 6/2000 | Mangin et al. |
| 6,223,164 | B1 | 4/2001 | Seare et al. |
| 6,611,815 | B1 | 8/2003 | Lewis et al. |
| 6,647,374 | B2 * | 11/2003 | Kansal .................. 705/37 |
| 2002/0188480 | A1 * | 12/2002 | Liebeskind et al. ............ 705/4 |
| 2003/0187697 | A1 * | 10/2003 | Bonissone .................. 705/4 |
| 2003/0200121 | A1 * | 10/2003 | Santoloci ..................... 705/4 |
| 2003/0200123 | A1 * | 10/2003 | Burge et al. .................. 705/4 |
| 2006/0015373 | A1 * | 1/2006 | Cuypers ....................... 705/4 |

OTHER PUBLICATIONS

"Harvard Pilgrim/DxCG"; Insurance & Technology, vol. 27, No. 10, p. 10, Sep. 2002. ISSN: 1054-0733. Dialog ID No. 10102977. From Dialog File 16: Gale Group PROMPT. (The author is not available for this article).*

"The cost of pension insurance," by Steven Boyce et al; Journal of Risk & Insurance; vol. 69, No. 2, p. 121-170, Jun. 2002. ISSN: 0022-4367. Dialog ID No. 02377862. From Dialog File 14: ABI/Inform.*

List of Diagnosis Related Groups (DRGs), FY 1995: http://www.hcfa.gov/stats/drg95dsc.xls.

R.F. Averill et al., Development and Evaluation of Clinical Risk Groups (CRGs) HIS Research Report Sep. 1999 http://www.hcfa.gov/stats/ss95both.xls.

Mark S. Blumberg M.D., Maryland Mortality for Non-Elective Surgery: A Prototype Ramo System (May 6, 1987).

D.L. Dunn et al., A Comparative Analysis of Methods of Health Risk Assessment Final Report, Society of Actuaries, Dec. 21, 1995.

G. Thomas Ray, et al., The Cost of Health Conditions in a Health Maintenance Organization, Medical Care Research and Review, vol. 57, No. 1, (Mar. 2000) pp. 92-109.

Mark S. Blumberg, Potentials and Limitations of Database Research, Statistics in Medicine, vol. 10, No. 4, p. 637, 1987.

Annemarie V. Wouters, Disaggragated Annual Health Services Expenditures: Their Predictability and Role as Predictors, Heath Services Research vol. 26, pp. 247-272, Jun. 1991.

G. Binns et al., Extracting More Profits from Small Group Renewals presentation to Conseco Health, Dec. 7, 1999.

G. Binns et al., Mining the Data for Smarter Renewals presentation to Fortis, Nov. 15, 1999.

* cited by examiner

COMPUTERIZED MEDICAL UNDERWRITING OF GROUP LIFE AND DISABILITY INSURANCE USING MEDICAL CLAIMS DATA

BACKGROUND OF THE INVENTION

1. Field of the Invention

The present invention relates to a new technology to underwrite group disability insurance. In particular, the present invention relates to predicting the expected claims to be made by a group based on pooled historical data of claims for disability insurance and pooled historical data of medical claims.

2. Background Art

Group insurance for Long Term Disability (LTD) and Short Term Disability (STD) for employees is widely available. In order to set appropriate premiums for these risks it is necessary to estimate the likelihood of the insured events (number of disabilities) and the severity (or cost) of each event, for each insured group. Because of the relative rarity of these events for long term disability, the experience of a group is too small to provide reliable estimates for any but the largest groups (e.g., with ten thousand or more employees).

The following is an example illustrating the risk profile presented by groups of modest size, in this case for a group of 500 employees. It assumes that the binominal distribution is an accurate representation of the likelihood of disability. A 90% confidence interval is calculated. The following table lists the range of number of long term disability claims in the confidence interval at 3 different probabilities for the event.

TABLE 1

Confidence Interval Example

| | 90% Confidence Interval | |
|---|---|---|
| Probability | Lower Bound | Upper Bound |
| .001 | 0 | 2 |
| .005 | 0 | 5 |
| .010 | 2 | 9 |

If a group has 2 events, it is in the 90% confidence interval for probabilities 0.001, 0.005 and 0.010 or a potential range of a 10-fold difference in true underlying probabilities for the event. This could result in a 10-fold difference in premium. If 0 or 1 event occurs, the underlying rate could be a 0.001 or 0.005 or a 5-fold difference in the true probability. Therefore, refined analytic methods are needed for accurate premium rate settings to reflect the group's underlying risk since the 5-fold or 10-fold difference in risk would turn into a 5-fold or 10-fold difference in insurance premium. The 5-fold or 10-fold range in risk and premium should be unacceptable to both the insurer and the insured.

The alternative actuarial approach uses estimates of group risk based on the age and gender (demographics) of each group's employees by using tables based on data pooled from many groups (i.e., manual rates). For example, the likelihood of a 20 year old male having a long term disability claim in a year is about 1/1,000 and the likelihood for a 62 years old male is about 10/1,000. The group risk is calculated by summing each eligible employee's demographic risk, the sum being the group's base risk. The group's experience may be used to adjust (usually done via a weighted average) the demographic risk higher or lower, depending upon the historical experience. While the demographic incidence rates may be modified by the industrial codes and geographic location of specific groups they do not specifically adjust for the considerable variation in the underlying morbidity of employees which underlies the risks of long term disability claims. The experience based rates adjust for the historical or backward looking component of underlying morbidity, where people still on long term disability are not part of the current insured risk (i.e., they do not contribute to the forward looking morbidity risk of the insured group since they are not part of its workforce unless they come back to work and they are no longer disabled).

Accordingly, there is a need for underwriting methods that address groups of modest size and accounts for the underlying morbidity of the employees making up a group.

BRIEF SUMMARY OF THE INVENTION

In order to improve measuring risks of disability for each insured group of employees, the present invention develops methods for achieving the following:

1. Providing standards for the probability of having a claim for disability based on pooled historical disability claims data, that include disease and injury specific data, measured against pooled medical claims data.

2. Providing expected costs (i.e., salary replacement costs caused by the duration of the disability) of disability claims based on disease and injury specific causes of claims by the analysis of pooled historical disability claims.

3. Applying 1 and 2 above to the recent medical claims data for each insured employee group to estimate its current risks for disability.

One benefit of this invention over traditional actuarial methods is to calculate group premium rates that are more accurate than premium rates derived from manual, experience or combined manual with experience based underwriting. The present invention develops a morbidity structure and applies quantitative algorithms or statistical models to the medical claims data for individuals in a group. The results include predicted incidence rates of disability and predicted cost for disability. These estimates are weighted by the salary replacement cost. The results of application of this invention are a more accurate estimate of the group's predicted exposure for disability insurance than is available through traditional methods.

Individual disability insurance policies are frequently underwritten using the results of a medical exam including hematology analysis, urine analysis, vital signs, history and electrocardiogram. These costly exams are used to more accurately assess and price disability risk than can be done using demographics alone. The disability insurer wants to avoid anti-selection where people with greater risk than average apply and obtain insurance coverage without a corresponding increase in premium. This approach is rarely used in the group market due to its cost, intrusiveness and lack of group level benchmarks or algorithms for aggregating results to the group level. Current individual long term disability underwriting uses different measures of morbidity (e.g., lab results) and different algorithms for pricing coverage.

Still further benefits and advantages of the invention will be apparent to the skilled worker from the discussion that follows.

DETAILED DESCRIPTION OF THE INVENTION

I. Incidence Rate Calculations for Disability

Although the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated. Accordingly, "disability" is used to refer to either LTD or STD since the same methods can be applied to either insurance product.

It is to be further understood that the title of this sections of the specification, including but not limited to "Detailed Description of the Invention" relates to a requirement of the United States Patent and Trademark Office, and is not intended to, does not imply, nor should be inferred to limit the subject matter disclosed herein or the scope of the invention.

Figure 1:
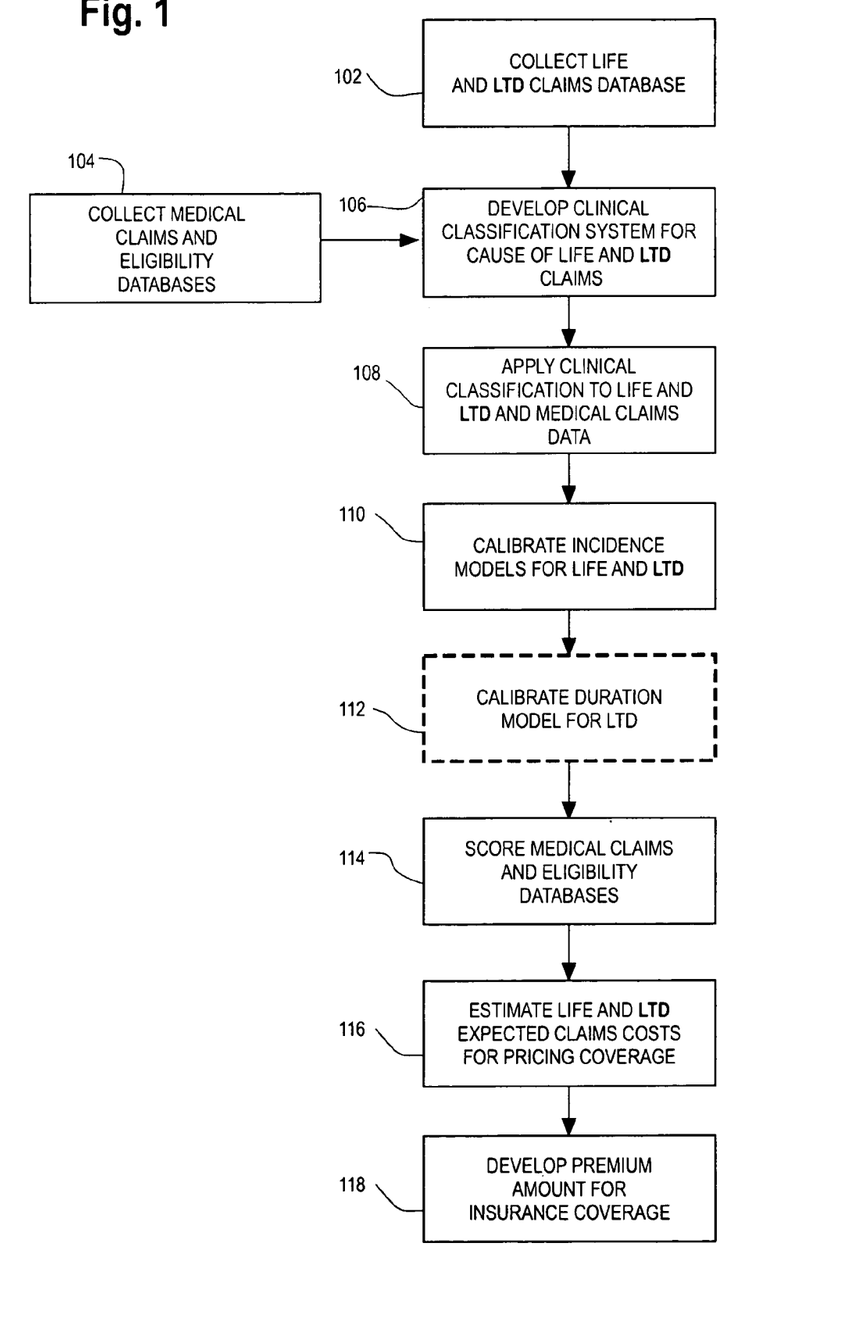
FIG. 1 is a flowchart of an embodiment of an overview of a method for estimating future disability claim costs and pricing the associated insurance premium for coverage.

Referring to FIG. 1, an exemplary embodiment of the present invention collects disability claim information (box 102) and also collects medical claims information (box 104). A clinical classification system is developed for the cause of the disability claims in the database (box 106) and applied consistently to both the disability claims and the medical claim data (box 108). The clinical classification system is then collapsed into a more tractable number of categories, called morbidity categories, in order to get more stable incidence rate estimates (box 109). Models for the incidence of disability claims are calibrated (box 110) and a cost model is also calibrated (box 112). The medical claim and eligibility databases are then scored (box 114). The results of that scoring can then be used to estimate the number and cost of expected claims which can be used to estimate total expected claims costs or disability exposure (box 116). The results of the scoring can then be used to determine pricing for disability coverage (box 118).

This invention uses an alternative approach to traditional experience or demographic based underwriting. This invention can use disability claims data (particularly diagnostic information—see box 102 in FIG. 1 regarding disability claims data and below for exemplary data layout in Table 2 also see Appendix 1 for a SAS program to read disability claim files in an Excel format) as a first database (or disability claims database).

TABLE 2

Sample Disability Data Layout

| Variable | Type | Format |
| --- | --- | --- |
| sex | Char | $4.00 |
| ep | Num | BEST13. |
| dx | Char | $6.00 |
| patdob | Num | YYMMDD10. |
| disdate | Num | YYMMDD10. |
| opendate | Num | YYMMDD10. |
| closedate | Num | YYMMDD10. |
| reopendate | Num | YYMMDD10. |
| reclosedate | Num | YYMMDD10. |
| opend | Num | BEST9. |
| closed | Num | BEST9. |
| totdurday | Num | 12 |
| source | Char | $4.00 |
| age | Num | 12 |
| male | Num | 12 |
| continuance | Num | 12 |

Where sex is the gender of the subject, ep is the elimination period or amount of time that a person must be disabled prior to receiving disability benefits, dx is the diagnosis of the condition causing the disability, patdob is the claimant's date of birth, disdate is the date of the disability, open date is the date the claimant was first eligible for disability benefits, closedate is the last date the claimant was eligible for benefits, reopen and recluse dates are for a second round of the same disability, opend is a dummy variable equal to 1 if the claim is open and equal to 0 if it's not open, closed is a dummy equal to 1 if the claim is closed and equal to 0 otherwise, totdurday is the total duration of the disability claim in days, source is the block of business that was the source for the disability claims, age is the age of the claimant, male is 1 if male claimant and 0 otherwise and continuance is an estimate of the continued duration if the claim is open at the end of the time period of observation for the claims.

Medical claims data must include computerized diagnostic information to augment demographic data—see box 104 of FIG. 1 and below for exemplary data layout in Tables 3 and 4 is a second database (or medical claims database).

TABLE 3

Samples Medical Claims Variables (Employees Only)

| Variable | Type | Format |
| --- | --- | --- |
| group | Char | $14.00 |
| personid | Char | $20.00 |
| DX1-DX5 | Num | $5.00 |

Where group is the employer ID, personid is the employee's ID and DX1-DX5 are up to 5 diagnoses associated with that employee. Appendix 2 contains an example SAS data standardization program for a typical medical claims datase.

TABLE 4

Samples Enrollment Variables (Employees Only)

| Variable | Type | Format |
|---|---|---|
| group | Char | $14.00 |
| SEX | Char | $1.00 |
| personid | Char | $20.00 |
| PATDOB | Num | YYMMDD |

Where group is the employer, SEX is the gender of the employee, personid is the employee's ID number and PATDOB is the employee's date of birth.

The present invention does not require that these databases be linked at the person level but nevertheless may be practiced with some or all of the data being linked, though with all the data linked other methods would probably be used by those of ordinary skill in the art. A practicable exception is for the group and employee linkage between the medical claims and eligibility file as per the data in Tables 3 and 4 above, but with no linkage between Table 2 and Table 3 or 4. In other words, a large disability claims database can be used with a large medical claims database possibly from a separate population to develop incidence rate models for disability claims.

To facilitate the collection of medical data as exemplified by box 104, below is a sample program to standardize disability medical claims data with ICD-9-CM (or 10) codes, (the standard for U.S. medical, life and disability insurers for coding the cause of a claim, and these data can be 5 digit or 3 digit ICD codes. Other coding or medical classification systems also exist, e.g., SNOMED. For the purposes of the present invention codes like ICD-9-CM or 10SNOMED, or other systems that are used to categorize medical conditions are referred to as medical condition codes.

An exemplary disability Standarization Program Example follows:

if opend eq . then opend=0;

if closed eq . then closed=0;

IF dx1 eq ' ' or dx1 eq '0' then DELETE;

begdate =disdate +ep;***USING DIS DAT AND EP AS BEGINING and open;

begdatenew=disdate +ep;***USING DIS DAT AND EP AS BEGINING and open;

opendate=begdatenew;

age=floor((opendate-patdob)/365.254);

if closedate ne . then dur1day=(closedate-begdatenew);

totdurday=dur1day;

locate=indexc(dx, '.');

length=length(dx);

**CORRECT FOR MISSING LEADING ZERO'S;

if locate ne 4 and locate ne 0 then do;

if locate eq 2 then dx='00'||compress(dx, '.');

if locate eq 3 then dx='0'||compress(dx, '.');

end;

if length eq 2 & locate eq 0 & dx ne ' ' then dx='0'||compress(dx);

if length eq 1 & locate eq 0 & dx ne ' ' then dx='00'||compress(dx);

if locate in (4,0) then dx=compress(dx, '.');

if sex eq 'M' them male=1; else male=0;

** PULL OUT OF SELECTION PERIOD TO DIFFERENT DATASET;

if age gt 64 then output dat.ageo64;
  IF OPENDATE GE '01JAN2000'd then output dat.outofsel;

else
  IF OPENDATE lt '01JUL1994'D then output dat.outofsel;

** PULL SHORT OR CONCERNED INVALID DURATION DAYS;

else if totdurday lt 15 then output dat.baddur;

ELSE if ep <90 then output dat.outofsel;

** PRELIMINARY DATA TO CONCATENATE WITH OTHER SOURCES;

else output dat.markshort;

The data can be read from an Excel spreadsheet, for instance, to be analyzed in a computer system coded to implement the present invention. One system that can be used to implement the present invention is the commercially available statistics program SAS produced by SAS Institute of Cary, N.C. The input data are converted to the format needed (i.e., standardized) by the analysis system and variable names from the disability claims database are mapped to standardized names utilized by the analysis system. In the present examples, the medical condition codes used by the analysis system are modified ICD-9-CM codes, but other code systems or modifications of the ICD-9-CM system may be used.

Data can be validated by comparing summarized data from the medical claims and disability claims to control totals (e.g., total number of records, number of claims, total claims paid, etc.) and other summary reports developed by the organization supplying the data-standard computer processing techniques for validating accurate data transfer and reading. The data can also be standardized into common units such as date format, level of medical condition code used (e.g., for ICD-9, 5 digit, 3 digit, subchapter grouping) and currency units.

A universe of claims eligible for analysis and use in the database can be defined and used to create and calibrate the disability prediction models. A universe of eligible claims can exemplarily comprise data such as date range for claims, the covered person's age and gender, and the covered person's employment status. The disability data can have continuance estimates appended for open cases as an estimate of the total duration where a continuance estimate is an actuarial estimate of the expected additional duration for an open disability claim. When each source is complete the files can be concatenated into one file.

Continuing the discussion of box 104 in FIG. 1, in Appendix 2 is a SAS program for medical claims data to standardize its format for processing. Each source of data may have a different layout. The medical claims data can be validated, cleaned and then standardized.

A universe is defined and data that have similar formats from different sources can be concatenated into one file for summarization and analysis.

The coding of the medical claims and long term disability claims with medical condition codes should be at the same level of specificity, and as indicated earlier, is not limited as to form. The medical condition coding system can have different levels of specificity, and may be hierarchical in nature such that a higher level of a hierarchy may subsume multiple elements of a more detailed hierarchy below. Where medical claims data and disability data are not in a consistent format, but can be mapped onto the same system, where the system mapped to is hierarchical the coarsest level may need to be used for comparability across data sets. Additionally, common but inconsequential diagnoses will be ignored in the medical claims when the disability claims data do not contain that level of detail, that is to say that while a condition may be categorized for medical care purposes, it has no presence in databases tracking causes of disability.

The medical claims and disability databases are usually from different populations. The resulting morbidity based disability incidence models are then applied to different groups' medical claims data to produce expected disability exposure for underwriting disability insurance. This refined estimate of claim frequency and severity can then be used in estimating the costs associated with insurance coverage and accordingly pricing the insurance coverage.

The morbidity model based insurance premium pricing can be an adjustment of the traditional demographic or experience based methods used by actuaries and underwriters or derived separately using exposure data and actual claims experience.

Disability cost and total exposure estimates derived from the medical claims data for pricing disability will be described later.

Often, the age by gender specific incidence of medical conditions or morbidity can be similar in the insured populations of employees for both the medical claims database and the disability claims database, and incidence rate estimation can be done on that basis.

Large disability and medical claim files help assure that they are more likely to have similar morbidity patterns (within age by gender strata) than smaller, more selective files.

Use of standard Society of Actuaries (SOA) age by gender standards to estimate disability claim risk also involves a similar operating limitation; specifically, that the morbidity pattern in the population used as the SOA standard is similar to the disability insured population being priced. This is because morbidity of the insured population drives the system, not age or gender of the insured population directly.

Under the conditions of similar proportions of medical conditions (within age by gender) for the medical population and the disability population, the relative incidence rate can be calculated for such conditions using conditional probabilities or similar measures. Traditionally, the incidence rate for disability is the number of disability claims in a year divided by the number of insured people and stratified by combinations of age, gender, occupation and other factors related to disability claims. However, these calculations of incidence rates are not done by morbidity condition with current underwriting procedures for groups.

This method and system of the present invention calculates the incidence rates conditionalized on morbidity condition can be calculated in addition to demographics and other factors. While any conditional probability estimation method can be adapted for the practice of this invention, Bayes Theorem is used for the preferred embodiment of this invention:

$$\text{Probability}(A \text{ given } B) = \frac{\text{probability}(B \text{ given } A) \times \text{probability}(A)}{\text{probability}(B)}$$

This calculation is normally done within an age by gender strata, but the calculation can also be applied to data having morbidity information that has not been stratified. A concrete example is provided below. For disability insurance:

Probability (disability given diagnosis Y)=probability (diagnosis Y given disability)* probability (disability)/probability (diagnosis Y), where the probability (diagnosis Y given disability) equals the proportion of disability claims resulting from diagnosis Y (a morbidity category), the probability of diagnosis Y equals the proportion of the insured population with diagnosis Y, and the probability of disability is the disability rate for the age by gender strata for a large insured population with similar characteristics.

The following table is a concrete example of a Bayesian calculation for the probability of a long term disability claim for a male 55-64 years old with lung cancer and a 180 day elimination period (EP). Lung cancer is 4.43% of long term disability cases for males 55-64 (=probability (B given A) from equation above), the probability of long term disability is 0.0091 for 55-64 males with 180 day EP (=probability (A) or the prior from equation above) and the probability of lung cancer for males 55-64 is 0.62% (=probability (B) from equation above). This results in a Bayesian probability estimate of 0.065 (=probability (A given B) from equation above) or the probability of a long term disability claim given lung cancer is 6.5% using these calculations, as shown in Table 5.

TABLE 5

| Male 55-64 with 180 day Elimination Period | | |
|---|---|---|
| | LTD | Medical |
| Lung cancer count | 69 | 72 |
| Total count | 1558 | 11538 |
| % | 4.43% | 0.62% |
| Prior Probability of LTD | 0.0091 | |

Bayesian Prob. = (.0443/.0062)*.0091
Bayesian Probability LTD given Lung Cancer = 0.065

Therefore, the probability (disability given diagnosis Y) can be calculated using readily available medical and disability insurance claims data. This is the fundamental building block for calculating morbidity based disability rates.

A more general alternative to Bayes Theorem for calculating conditional probabilities is a Bayesian Network where Bayes Theorem is applied multiple times in the context of a decision tree, conditionalizing the probability on variables such as age, gender, standard industry classification code (SIC code) of employer, occupation, geographic region, elimination period, company size and experience and other factors in addition to the morbidity. Graph theory (especially directed or acyclical graphs), Monte Carlo simulations and other techniques can be used to calculate the joint and conditional probabilities needed for predicting the incidence rate of disability claims for individuals and groups of employees. The result of these joint and conditional probability calculations is a look-up table of incidence rates that is used to score each person in a group. The person's characteristics are classification factors for the table and the associated incidence rate for disability is a predicted conditional probability that is looked-up in the appropriate cells of the table. For example, a female 45-49 with lung cancer and an elimination period of 6 months has about a 6% incidence of having a long term disability claim also.

Figure 2:
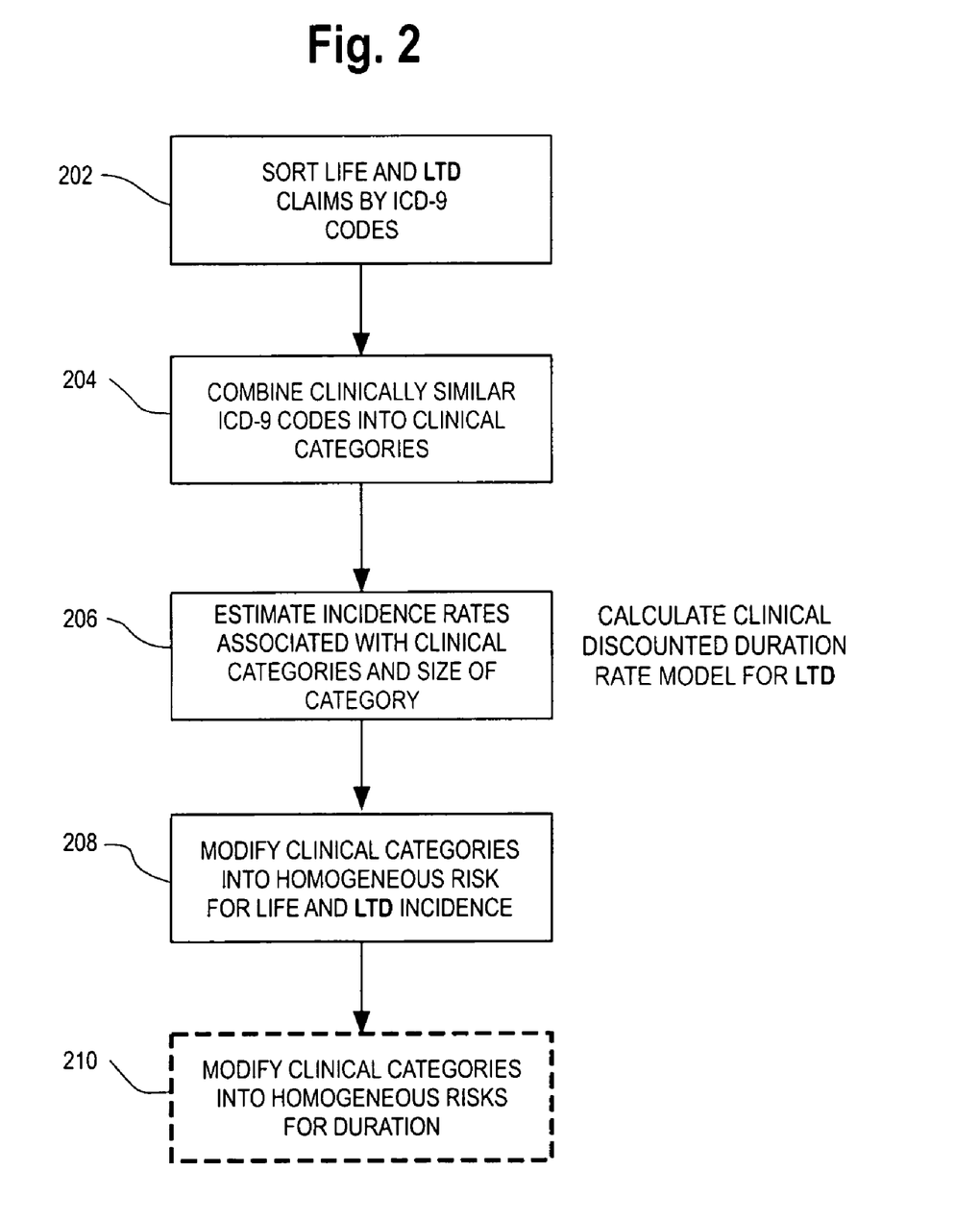
FIG. 2 is a flowchart of an embodiment of a process for developing a morbidity classification system for disability claims. It details boxes 106, 108 and 109 of FIG. 1.

Referring to box 106 of FIG. 1, the preferred embodiment uses groupings of ICD 9-CM (or 10 or other coding schemes) diagnosis codes to define morbidity categories. The coding system should be the same for medical and disability claims or be able to be mapped uniquely onto a common coding system. The exemplary embodiment of the present invention uses ICD-9-CM, the present industry standard coding system. However, the present modeling approach can be applied to other classification systems with just as much validity. The accuracy of the present modeling approach will be dependent upon the accuracy of the classification system, the coding accuracy, the representativeness of the sampled population and the amount of data available for model calibration.) The morbidity categories should be homogeneous (see boxes 204 and 206) with similar likelihood of leading to disability Non homogeneous categories can be used if the likelihood of disability is similar by medical condition code within the category. The objective is to develop morbidity categories that are clinically similar or at least have similar risk (e.g., Bayesian probability of the insured event) and are large enough to lead to robust estimates of the incidence.

A disability insurer typically does not have medical information on a large portion of its insured customers so the conditional and joint probabilities cannot be calculated directly. This invention's preferred embodiment calculates the probability (disability given diagnosis Y) directly using the definition of a conditional probability when appropriate data are available (medical and disability claims are linked at the person level) and using a technique such as Bayes Theorem or Bayesian Networks when the data do not support a direct calculation of the conditional probability. A simple example has 10,000 males 55-64 covered for medical and long term disability. 6 of those males covered have long term disability claims from lung cancer and a total of 100 have lung cancer as a medical condition, resulting in a conditional probability of 6/100 or 6% of having a long term disability claim given that you are a male 55-64 and have lung cancer.

Referring to box 109 in FIG. 1, the medical and disability claims are classified by morbidity category. The following is one simple example describing using a listing of ICD-9 codes as one possible definition of the lung cancer morbidity category.

Other definitions may be used also or the category combined with other cancers, etc.

The number is the ICD-9-CM diagnosis code and the following text is an abbreviated name (MAL or MALIG "malignant", NEO means "neoplasm", NEC means "Not Elsewhere Classified", and NOS means "Not Otherwise Specified") of the site of the lung cancer.

162 MAL NEO TRACHEA/LUNG*

1622 MALIG NEO MAIN BRONCHUS

1623 MAL NEO UPPER LOBE LUNG

1625 MAL NEO LOWER LOBE LUNG

1628 MAL NEO BRONCH/LUNG NEC

1629 MAL NEO BRONCH/LUNG NOS

164 MAL NEO THYMUS/MEDIASTIN*

The calculation using Bayes Theorem of the probability (disability given diagnosis Y) equals the (proportion of the disability claims with diagnosis Y as the cause—calculated from the disability claims file) times the (overall incidence of disability) divided by the (probability of diagnosis Y) which equals the proportion of people with diagnosis Y in the medical claims database.

Referring to box 110 in FIG. 1, the proportion of people with diagnosis Y is calculated as the number of people with a medical claim of diagnosis Y divided by the total number of people enrolled for medical coverage. When the medical claims and disability claims are directly linked by a unique person level identifier (from the same person) the conditional probability can be calculated directly using the formula $$\text{Probability (disability given diagnosis X)} = \text{Probability (disability and diagnosis X)}/\text{Probability (diagnosis X)}$$

This is the preferred embodiment when the data are linked at the person level although such data are rare, and the invention can be used where such data is not linked at the person level.

Calculations are typically done using age ranges (frequently 9 ranges of 5 years, such as 20-24 (or 18-24), 25-29 . . . 60-64 by male/female) for groups of insured employees. This process makes an array of boxes, one axis being diagnosis, and the other an age range (see Table 6 for an example).

TABLE 6

| General Category for Incidence Rate Calculations | Age 18-24 | Age 25-29 | Age 30-34 | Age 35-39 |
|---|---|---|---|---|
| Infectious diseases | 5 | 52 | 33 | 10 |

Estimates of the Bayesian or conditional probability of disability given a diagnosis X are calculated for a set of morbidity conditions within each age by gender strata. The number of morbidity conditions that are useful will be driven by the number of disability claims by strata and the frequency by morbidity conditions. Fewer than 5 claims per age by gender strata or cell is not very credible for probability calculations. At least 10 claims per cell are recommended; however, adjacent ages or gender can be combined for greater counts, providing greater rate stability if they have similar underlying distributions. For example, sometimes you merge two or more adjacent but not credible boxes to make a contiguous credible box. Table 7 shows two generic cases, and Table 8 shows a concrete example of merging categories from Table 6.

TABLE 7

|  | Age 1 | Age 2 | Age 3 | Age 4 |
|---|---|---|---|---|
| male |  |  |  | Merged gender example |
| female |  | Merged adjacent age example |  |  |

TABLE 8

| General Category for Incidence Rate Calculations | Age 18-24 and Age 25-29 | Age 30-34 and Age 35-39 |
| --- | --- | --- |
| Infectious diseases | 57 | 43 |

The enrolled medical population with medical claims typically will be larger than the disability claims file since the frequency of employees incurring one or more medical claims in a year is about 600-800/1,000 enrollees per year versus 1-10/1,000 enrollees for long term disability per year. Therefore, definitions of morbidity conditions producing credible probabilities within the disability files usually provides credible probability estimates in the medical claims calculations since the higher frequency of medical claims than long term disability claims gives larger number of cases and more credible estimates of incidence rates.

Box 206 of FIG. 2 and the table for Males 55-64 with EP 180 (where EP means elimination Period or the number of contiguous days that a claimant must be disabled before he or she is eligible to receive disability compensation) and lung cancer illustrate Bayesian probability calculations. When the incidence rates of disability are different for similar conditions, those conditions should be put into separate morbidity categories for predicting future disability claims for underwriting (see box 208). Additionally, if the average cost or duration of disability claims are different then the morbidity categories should be kept separate also (see box 210).

Many disability claim files have a single medical condition code as a cause of disability. People in medical plans may have numerous diagnoses in a year. (Note that one year is used in this invention as the standard contract time period for pricing and rate estimation even if the insurance contract is for a different time period since one year eliminates seasonality and most claim files have observations based on groups enrolled for multiples of a year but other time periods can be used by rescaling all of the calculations.) If the disability claims file has multiple codes, then morbidity categories can be defined as combinations of multiple medical condition codes. Otherwise, there will be multiple morbidity categories associated with individuals in the medical claim files and only one morbidity category associated with the disability claim.

This potential multiple counting of individuals or morbidity categories can be adjusted for in many ways. The most straightforward adjustment is to assume the highest probability morbidity condition only for an individual. One alternative is that all morbidity conditions can be used and assume statistical independence between the conditions. The overlap between the pairs, triples, etc. of morbidity conditions needs to be calculated so that they are not double counted. The following is a general formula for calculating the union of independent events A1 through An.

$$P(\cup Ai \text{ for } i=1,\ldots,n) = \Sigma P(Ai) - \Sigma_{ij}{}^{\neq} P(Ai \cap A_j) + \Sigma_{ijk} P(Ai..\cap A_j. \cap A..k) - \ldots + (-1)^{n-1} P(\cap Ai \text{ for } i=1,\ldots,n)$$

If the morbidity conditions have a positive interaction with one another (the likelihood of disability is greater than the sum of the parts) then double counting would be a more accurate estimate of the probability of a disability claim than the union of the probability assuming statistical independence.

The preferred embodiment of this invention normalizes or sets the estimate of the total number of expected disability claims for a large block of business (e.g., all groups in a large medical plan) to the expected number of claims for that block calculated using a traditional actuarial model driven by demographics and other non-morbidity factors. Morbidity groups with few or no disability claims can be omitted. The method used for adjusting the multiple morbidity conditions in the medical claims will not have any influence on the total expected number of disability claims for the block of business if the block is set to equal the number of expected claims from the demographic model. This assumption is not necessary but can be made. However, there could be large differences at the person and group levels.

Figure 3:
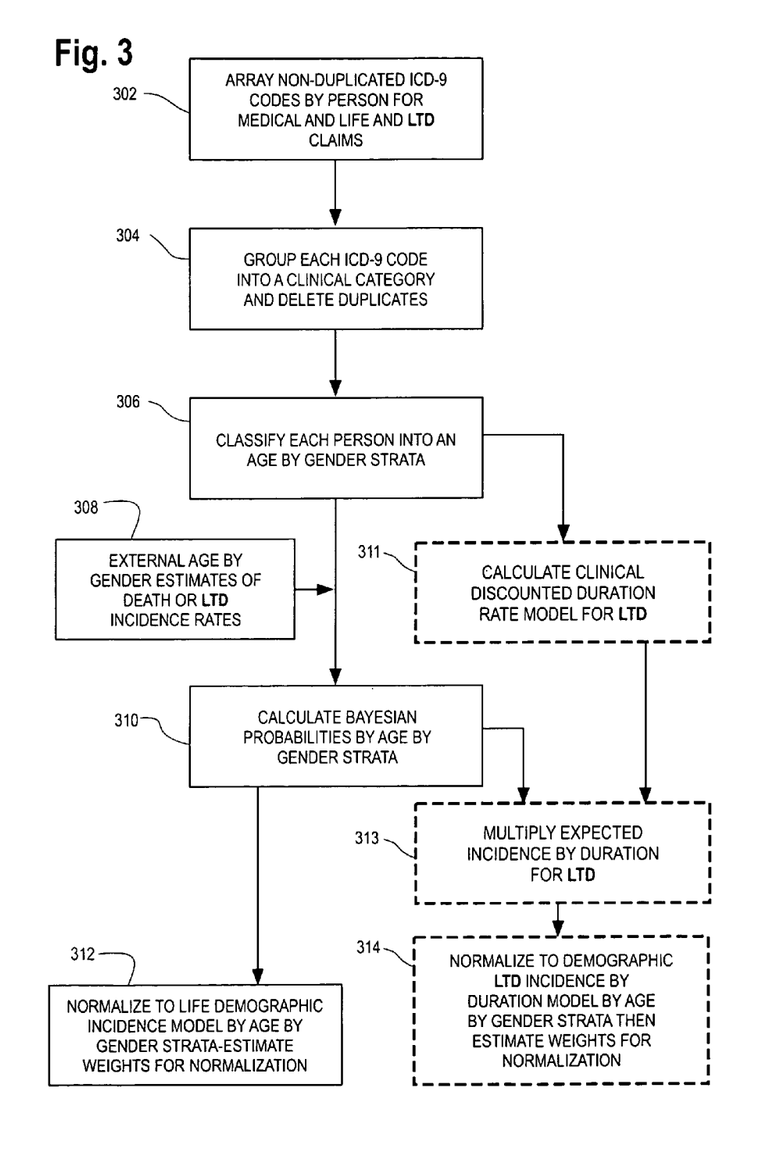
FIG. 3 is a flowchart of an embodiment for applying the disability morbidity classification system to calculate incidence rates for disability and cost estimates for disability using medical claims data for underwriting groups and disability claims databases for calibrating the disability risk factors. This details boxes 110 and 112 of FIG. 1.

The medical condition codes for a person with medical claims are combined into a non-duplicated array covering a fixed time period such as a year (see box 302). Each distinct medical condition code is then classified into a morbidity category and duplicates of each category are dropped (see box 304). All people in the eligibility file, including those with and without medical claims, are also classified into age by gender strata regardless of whether they have a medical condition code (see box 306). External age by gender rates of disability (see box 308) may be used to calibrate the overall incidence rate estimates to established standards. Those rate estimates are used in the numerator of the Bayesian probability calculations as the prior probability of disability (see box 310).

A normalization of the incidence rates for disability insurance (see 312) is done by age by gender strata across all morbidity categories by setting the total estimate for the morbidity model for each demographic stratum for a block of business to equal the total estimate from a demographic model for the same demographic strata. In other words, the normalization is a simple, proportionate adjustment increasing or decreasing the morbidity model prediction so that the number of expected disability claims from the morbidity model equals the expected number of disability claims from the demographic model for a large book of business. Dividing the demographic estimate by the morbidity estimate produces the normalizing factor that will equalize the morbidity and demographic model estimates. This factor is then multiplied by each morbidity incidence rate estimate. This equalizes the morbidity and demographic incidence rates for the entire block of business by demographic strata but allows individual group estimates to vary substantially. The strata and categories may be very fine or to only a few rates, depending upon the accuracy and amount of data. This normalization is not necessary but optional.

Disability Cost

Disability insurance typically consists of a sequence of monthly wage replacement payments. Disability payments are terminated when the term of the contract expires (e.g., age 65 or a specific benefit period of Z years for long term disability), the person dies or returns to work. The disability payment is a portion of the disabled person's lost wages, frequently 60% of wages for long-term disability. An individual's expected disability cost=(expected incidence)*(expected discounted duration)*($ wage replacement for each unit of duration). Current underwriting methods for group policies assume that the groups have a typical distribution of underlying morbidity and the overall SOA or other normative average cost for groups with their age by gender distribution (along with other adjustments such as occupation or elimination period) is the best estimates of the cost of that group's disability claims. This invention uses the disability claims data to estimate the expected length of duration of disability by underlying morbidities within the group (from the medical claims data) since very different durations are associated with different morbidities or medical conditions. For example, pregnancies are associated with very short durations for long term disability (about 4 months) since they are time limited conditions while multiple sclerosis has an extremely long expected discounted duration for long term disability (about 10 years) since it can last for life and may not be fatal. The preferred embodiment uses time valued discounting of the future cost since the wage replacement is paid in today's dollars without any inflation adjustments. Any standard discounting formula or annuity formula may be used to calculate the present value of the expected income stream.

Referring to box 112 of FIG. 1, the cost model estimates by morbidity condition can be estimated directly from disability claim files without the need for integrating another database. The disability claim file typically includes the cause of the disability coded as a medical condition code, demographics, dates of disability, elimination period, termination date, an estimate of the continuance if the disability claim is still ongoing and other factors. The morbidity categories, demographic strata (e.g., age range by gender), elimination period and other factors can be used as risk factors or predictors of the cost (length) of the disability. The duration may be long so discounting of the cost is frequently used to get a truer cost of the disability estimated in today's dollars rather than future dollars. Many statistical or data mining techniques are available to calibrate the expected discounted cost prediction model: linear regression, non-linear regression, logistic regression, regression trees, hybrid combinations of linear regressions and trees, neural networks, look-up tables, curve fitting using splines, curve fitting of the cost with a probability density function by morbidity category using curve fitting software such as (RISK or other techniques. The two general approaches are to estimate the mean (point estimate) expected discounted cost or alternatively to estimate the probability distribution for the range of potential expected discounted costs.

The preferred embodiment of this invention uses ordinary least squares linear regressions for estimates of the mean discounted cost but many other techniques would yield similar results (see boxes 112 in FIG. 1, and box 311 in FIG. 3). The regression point estimate is an unbiased point estimate and is frequently the best estimate for pricing a group's disability insurance. Reserving for purchasing blocks of open claims and other uses may require the probability distribution estimates so that a range of values and their likelihood can be computed. The following is a SAS program as an example of a program to run and develop a regression model to calculate duration (closely related to expected costs) estimates for morbidities other than pregnancy. Interactions and main effects are used with the morbidity and demographic factors.

Using LTD Data Run Following Regressions

No Pregnancy

;

PROC REG DATA=DAT.NOPREGNEWRF

OUTEST=DAT.OLS_NOPREG_DUR_FINL;

OLS_BIG_NOPREG:MODEL ADJ_CONTINMOS=

EP90 male d724 d410 AGE3034 AGE3539 AGE4044 AGE4549

AGE5054 AGE5559 d144 d162 d174 d202 d311 d414 d437 d714 d715 d722 d723 d729 dV112 ginfect gendo gsymsig gresp gcirculoth ginjpoioth gmuscuoth gneoplsoth gnervouoth MSoth ep90AGE3034 ep90AGE3539 ep90AGE4044 ep90AGE4549 ep90AGE5054 D1444044 D4104054 D4144054

D4373554 D7143554 D7154049 D7244554 D7294049 GINFECT4054

Ggenito GENDO4049 GSYMSIG4049 GRESP3049 AIDSLT55 GCIRCULOTH4049

GNERVOUOTH4054 MSOTH3549;

RUN;

INTERACTIONS USED FOR NOPREG

IF BENNEO AND 45 <=AGE <=54 THEN BENNEO 4554 =1;ELSE BENNEO4554 =0;

IF BLIND AND 45 <=AGE <=55 THEN BLIND4554 = 1;ELSE BLIND4554 =0;

IF COPD AND 45 <=AGE <=56 THEN COPD4554=1; ELSE COPD4554 =0;

IF D714P AND 45 <=AGE <=57 THEN D714P4554 = 1;ELSE D714P4554 =0;

IF D724P AND 45 <=AGE <=58 THEN D724P4554 = 1;ELSE D724P4554 =0;

IF D729P AND 45 <=AGE <=59 THEN D729P4554=1; ELSE D729P4554 =0;

IF DIABETES AND 45 <=AGE <=60 THEN DIABETES4554 =1;ELSE DIABETES4554 =0;

IF EYE AND 45 <=AGE <=61 THEN EYE4554 =1;ELSE EYE4554 =0;

IF GMENTLOTH AND 45 <=AGE <=62 THEN GMENTLOTH4554 =1;ELSE GMENTLOTH4554 =0;

IF HEMAT AND 45 <=AGE <=63 THEN HEMAT4554 = 1;ELSE HEMAT4554 =0;

IF HEPATPL AND 45 <=AGE <=64 THEN HEPATPL 4554 =1;ELSE HEPATPL4554 =0;

IF HITRAUM AND 45 <=AGE <=65 THEN HITRAUM4554=1;ELSE HITRAUM4554 =0;

IF MALORPHAR AND 45 <=AGE <=66 THEN MALORPHAR4554 =1;ELSE MALORPHAR4554 =0;

IF MALGI AND 45 <=AGE <=67 THEN MALGI4554 = 1;ELSE MALGI4554 =0;

IF MALHEM AND 45 <=AGE <=68 THEN MALHEM4554 =1;ELSE MALHEM4554 =0;

IF MALRESP AND 45 <=AGE <=69 THEN MALRESP4554 =1;ELSE MALRESP4554 =0;

IF METAB AND 45 <=AGE <=70 THEN METAB4554 = 1;ELSE METAB4554 =0;

IF PARK AND 45 <=AGE <=71 THEN PARK4554=1; ELSE PARK4554 =0;

IF POLIO AND 45 <=AGE <=72 THEN POLIO4554 = 1;ELSE POLIO4554 =0;

IF PSYCO AND 45 <=AGE <=73 THEN PSYCO4554=1; ELSE PSYCO4554 =0;

IF REN AND 45 <=AGE <=74 THEN REN4554 =1;ELSE REN4554 =0;

IF RHEUM AND 45 <=AGE <=75 THEN RHEUM4554 = 1;ELSE RHEUM4554 =0;

IF VD AND 45 <=AGE <=76 THEN VD4554=1;ELSE VD4554 =0;

The discounted expected cost and the incidence rate are calculated using the regression model and Bayesian probability calculation, respectively, for each separate morbidity category for each person (see box 313). The expected cost is multiplied by the Bayesian probability to calculate the total expected discounted cost for that morbidity category for that person. Each person's expected discounted exposure by morbidity category (product of probability times cost) is summed to calculate that person's total expected discounted exposure for the preferred embodiment. The objective is to provide the most accurate estimate of disability cost for the group for use in setting the premium. The following is an example of a SAS scoring program for calculating expected discounted costs or duration by demographic by morbidity groupings for pregnancies and other morbidity groupings. Modeling and scoring of both pregnancies and other morbidity groupings are combined after processing of each separately.

Scoring Other Data
   proc score data=t2 score=dat.OLS100pregINT out=dat.finlpregscoredLTD type=PARMS predict;
   var EP90 AGE1824 AGE2529 AGE3539 OTHPREG;

WHERE allpreg eq 1;;

run;

proc score data=dat.t2 score=dat.OLS_nopreg_dur_finl out=dat.finlNOPREGscoreLTD type=PARMS predict;
   var EP90 male AGE3034 AGE3539 AGE4044 AGE4549 AGE5054

AGE5559 d144 d174 d202 d311 d354 d414 d437 d714 d715 d723 d724 d729 d959 dV112 ginfect gsymsig gcirculoth ginjpoioth gmentloth gmuscuoth gneoplsoth gnervouoth MSoth BENNEO COPD D714P D724P D729P

DIABETES EYE HEPATPL MALRESP METAB PARK PSYCO REN

EP90AGE3034 EP90AGE3539 EP90AGE4044 EP90AGE4549 EP90AGE5054

D1444044 D2023544 D4104054 D4144054 D4373554 D7143554 D7154049
   D7224054 D7244554 D7294049 GINFECT4054 GENDO4049 GSYMSIG4049

GRESP3049 AIDSLT55 GCIRCULOTH4049 GMUSCUOTH3554 GNERVOUOTH4054
   MSOTH3549 D729P4554 EYE4554 HEPATPL4554 MALHEM4554 PARK4554
   POLI04554 REN4554 GRESP D722 D410 GENDO AIDS MALHEM POLIO;
   where allpreg eq 0;run;

RUN;

data dat.scoredltd;

set dat.finlpregscoredLTD(rename= (ols_preg=OLS_CLIN))

dat.finlNOPREGscoreLTD(rename= (OLS_BIG_NOPREG=OLS_CLIN))

run;

An alternative use for discounted cost models is for buying and selling the liability of blocks of long term disability claims which have already occurred (open blocks of claims). An organization may wish to discharge long-term balance sheet liabilities associated with open long term disability claims. The disability has occurred so the incidence rate is 1.0. The discounted cost model can be applied to the open claims to estimate the expected cost of those claims. An additional adjustment to the discounted cost model is needed since the claim is open and has been paid for some amount of time. Therefore, the discounted cost model must be conditionalized on the length of time that the claim has been open. The effect of conditionalizing the claim should be estimated within morbidity category whenever sufficient data exists for credible estimates. This application of the discounted cost or duration is weighted by the amount paid per month. Summarizing over the entire block provides a more accurate estimate of future disability costs for that block. The estimate can be used for evaluating the price you would be willing to buy or sell that block of business for. An estimate of the variability of the total discounted disability cost can be made by Monte Carlo simulations or calculating the variance of the sum of the individual discounted cost or duration estimates. The benefit of the variance estimate is to more accurately predict the reasonable range of the block's disability cost. A larger range would imply a lower cost, everything else being equal, since there is greater risk. The benefit is more accurate pricing of blocks of open long term disability claims for the buyer or seller.

Calculating Person and Group Level Expected Disability Costs

Referring to boxes 114 and 116 of FIG. 1, in order to price the insurance, an expected claim cost or disability exposure must be calculated. Estimating the probability of a person having a disability claim is done by "scoring" the medical claims data (see also FIG. 4). A person level file is prepared that includes the person's age, gender and morbidity grouping(s) from the medical claims. The preferred embodiment uses a look-up table to associate the morbidity grouping(s) by age by gender strata (alternatively other factors such as elimination period, company SIC code, geographic region and others can be applied) with the probability of disability (see box 402). Multiple look-up tables may be required if alternative insurance options are required for pricing the long term disability coverage. For example, the elimination period for disability has a large impact on the probability of a disability with shorter elimination periods (earlier eligibility for disability coverage or shorter disability time prior to receiving wage replacement coverage) are associated with higher incidence rates of disability since it is easier to qualify for that definition of disability. Therefore, different incidence rates by demographic strata by elimination period are used in the Bayesian probability calculation. If multiple elimination periods (e.g., 90, 120, 180 days) are required, separate look-up tables can be calculated using different incidence rates (the overall demographic strata's probability of disability used in the Bayesian calculation). If the rates by elimination periods are not credible then the incidence rates for unusual elimination periods that are between credible rate estimates for elimination periods can be interpolated.

This modifies each person's expected number of disability claims for the interpolated elimination period.

Each person with morbidity grouping codes found associated with disability is scored by looking up the probability of disability associated with their demographic stratum and each of their morbidity grouping codes associated with disability. Morbidity codes that are not associated with any disabilities in the disability claim file may be assigned zero probabilities. Alternatively, the likelihood of disability by accident can be calculated and allocated according to demographics of all eligible employees, replacing the zero incidence rates for people with no medical claims.

Figure 4:
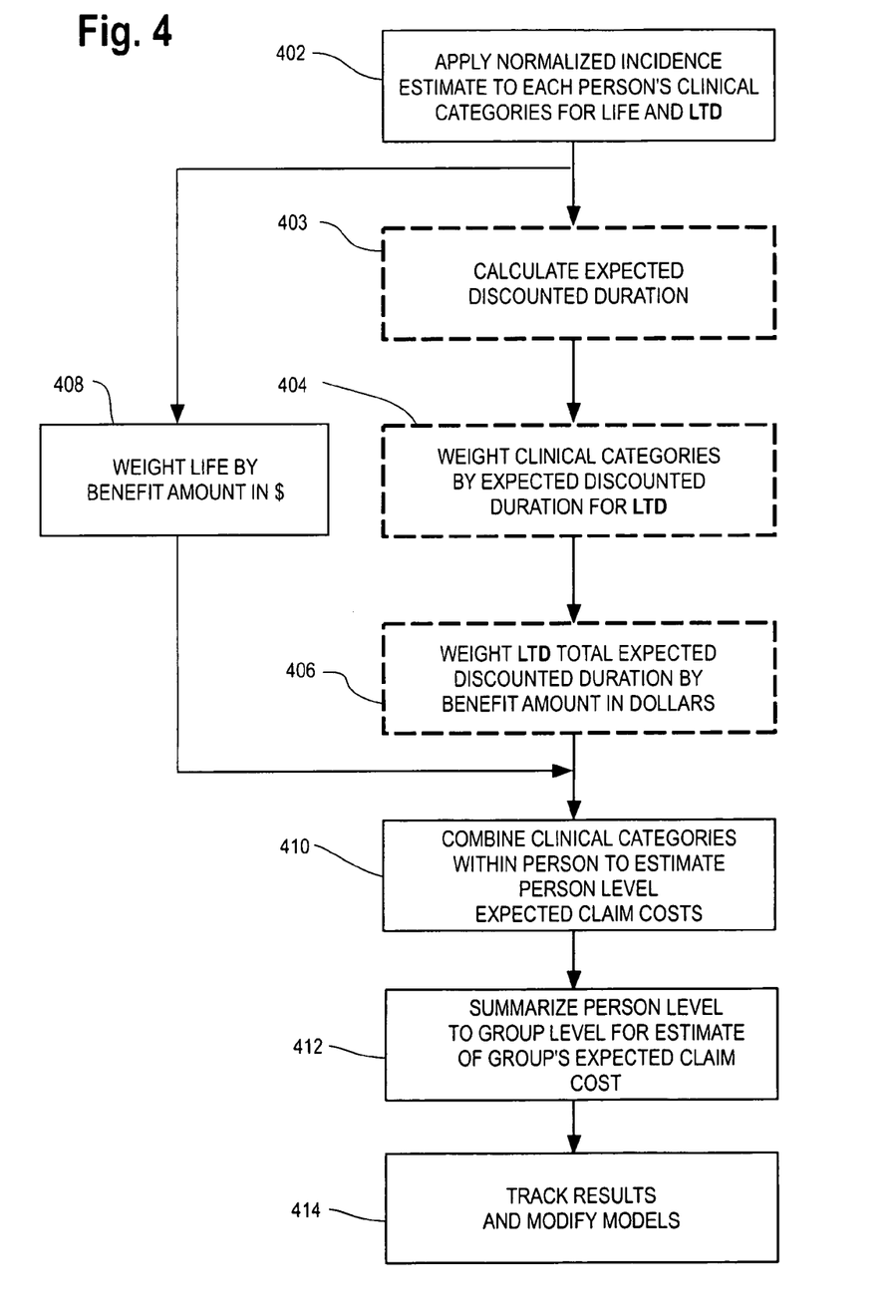
FIG. 4 is a flowchart of an embodiment for estimating each eligible person's expected disability claims and combining those estimates into a group level estimate of its claims cost and details boxes 114 and 116 in FIG. 1.

The expected discounted cost is then calculated for disability (see box 403). This step applies the cost regression model (from box 311) to each individual's demographic and policy characteristics for each morbidity condition; resulting in an expected cost for each morbidity grouping.

The likelihood (probability or incidence rate from box 402) for a morbidity grouping must be multiplied by the mean of the expected discounted cost (assuming the disability occurs) to calculate the expected value of the discounted cost for a person with a morbidity condition (see box 404). This is the expected value in expected discounted cost or disability months for that person for that morbidity grouping. The preferred embodiment assumes a zero probability of a disability claim for people with no diagnosis in the medical claims data.

In people with multiple morbidity groupings there is an issue of overlapping probabilities. When this occurs it can be handled as previously discussed. There is an additional consideration if the overlaps are not going to be double counted—the overlap must be assigned or pro rated to the multiple morbidity conditions to which it applies. This is important since different morbidity groupings have different expected discounted costs that are weighted by the probabilities of the morbidity turning into a disability. The region of the overlap in probabilities can be pro rated on the basis of the size of the non-overlapping probabilities. This can be calculated by taking the union of all of the morbidities and multiplying it by the portion of the sum of the overlapping probabilities to calculate the non-overlapping probability for each morbidity grouping. The expected cost for each morbidity grouping is then multiplied by the pro rated, non-overlapping probability associated with each morbidity. These products are summed by person to calculate his/her total expected discounted cost. The overlap is not a serious issue since the probability of rare events overlapping is very rare or a very small intersection for long term disability coverage.

The preferred embodiment uses double counting of the probability overlaps when a person has multiple morbidity groupings—assuming that the events are additive but that the sum can be no greater than 1.0 (a certain event). The largest sum of probabilities that we have observed for one person for long term disability is about 0.25, nowhere close to 1.0. The expected cost is multiplied by the probability of that morbidity condition becoming a disability in the next year for each of the person's morbidity conditions and then summed across the person's various morbidity conditions. This estimate includes double counting for people with multiple morbidity conditions. Therefore, the sum of the individual's expected discounted cost within a demographic stratum (e.g., males 18-24) for a large block of business may require recalibration to eliminate the double counting. One can normalize the morbidity model by multiplying each person's estimate by the ratio of the demographic stratum estimate divided by the morbidity estimate for those within that demographic stratum, producing total expected morbidity claims costs equal to the entire block for that demographic stratum (see box 402). The ratio of a group's demographic based expected discounted cost divided by the morbidity model's expected discounted cost is a measure of the relative morbidity risk for that group.

Referring to box 116 of FIG. 1, the sum of the expected discounted duration or a transformation of it that accounts for off-sets is our best estimate of the expected claims costs for the disability insurance coverage expressed in terms of months rather than dollars. The disability months can be transformed by multiplying each person's probability of disability by the monthly wage replacement by the average expected monthly cost for that person (see boxes 406, 410). The employees expected claims costs are then summed for the group (see box 412). Additional modifications for off-sets of payments by Social Security and other income sources may be used in the discounted cost calculations.

Actual underwriting results should be tracked over time and compared to the expected results. This information can be used to modify the incidence and cost models, especially for eliminating any systematic biases where the predictions are too high or too low (see box 116 in FIG. 1 and box 414 in FIG. 4).

Indication of a Price Quote and Morbidity Profile

The medical claims data and medical eligibility are not sufficient to provide a final quote for disability coverage since those files do not have an accurate census for disability, indicate the amount of coverage such as average wages, show the group's disability experience, or provide the industry type and occupation. However, a meaningful indication of the approximate proportion of the final quote to the current rates can be estimated by dividing the morbidity based estimate of claims costs by the demographic based estimate of claims costs (morbidity to demographic ratio).

This invention has an option of sending the morbidity to demographic ratio to the employer or broker representing the group. This indication would be sent to groups with morbidity to demographic ratio meaningfully below 1.0 along with a request for the information necessary to provide a final, binding disability insurance quote.

In addition, a morbidity profile may be provided that compares the employer to a norm by morbidity category for disability. The morbidity profile compares the percentage of employees with a morbidity condition that was used in the morbidity prediction model. The norm may be age by gender adjusted so that the employees' age or gender skew does not drive the differences. The objective is to provide information on morbidity conditions where the group may have an excess of morbidity so that disease management or other programs may be used to help reduce morbidity levels, thereby lowering the group's risk of disability. Morbidity improvement will lower future insurance costs and the employer's cost of turnover. Note that the conditions profiled are those morbidity conditions that are related to disability rather than future medical expenses. Profiles of a group's frequency of actual morbidity groupings from the medical claims versus an average or standard may be provided to better understand the potential cost of disability for a group or block of business.

Pricing Groups

Current actuarial estimates of risk frequently involve blending or averaging manual rates with experience based rates. Credibility theory is used to determine the weights assigned to each estimate. This concept can be generalized to include a morbidity based estimate of cost. The benefit of this approach is that the morbidity information is from details of the group's potential exposure while the manual rate reflects population averages and the experience provides information related to the historical propensity of people in the group to file a claim and its acceptance along with other factors. Weighting and combing all factors provides a unique estimate that should be more robust than estimates derived without the morbidity model's expectation.

Figure 5:
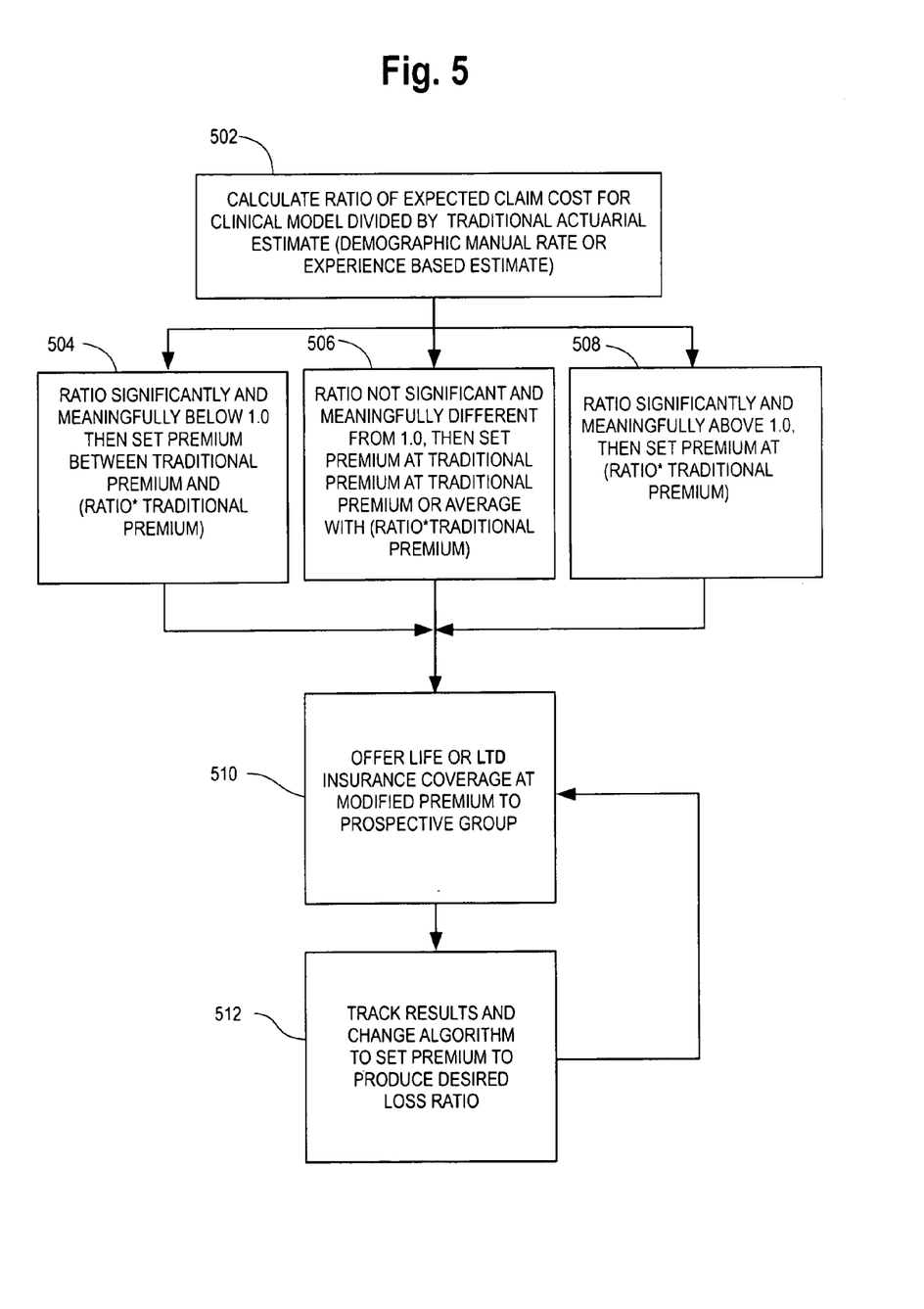
FIG. 5 is a flowchart of an embodiment of a method for using the expected exposure from the morbidity models to set a premium for pricing the disability insurance coverage and it details box 118 in FIG. 1.

The morbidity to demographic ratio (i.e. morbidity model based expected discounted cost divided by demographic model based expected discounted cost) can be used to adjust the traditional premium to more accurately reflect the morbidity characteristics of the group and its associated claims costs (see box 118 in FIG. 1 and box 502 in FIG. 5). When the morbidity to demographic ratio is meaningfully greater than 1.0 (see box 508), the demographic characteristics do not entirely account for the group's morbidity risk so the premium should be raised. The traditional premium can be multiplied by the morbidity to demographic ratio or a weighted average of the two methods may be taken based on the credibility of the two methods used. The preferred embodiment gives 100% credibility to the morbidity to demographic ratio so the traditional premium is multiplied by the morbidity to demographic ratio. This will discourage groups from accepting coverage without paying additional premium to compensate for its morbidity risk.

Conversely, when the morbidity to demographic ratio is meaningfully less than 1.0 (see box 504), its morbidity risk is lower than its demographic risk. The ratio can be multiplied by the traditional premium estimate to produce the same margin as the demographic model on the entire block of business. A smaller decrease may be enough price inducement to compel the customer to select this coverage over traditionally derived (and more expensive) premiums. For example, only half of the discount may be applied to the premium. Generally, the offered premium should be between the two estimates.

Typically, many groups will have a morbidity to demographic ratio that is close to 1.0 (see box 506). Those groups can be priced at the demographic based premium (manual rate) or a combination of the manual rate multiplied by the morbidity to demographic ratio or some other combination of the two factors.

Experience may be blended with the morbidity to demographic ratio. However, the confidence interval is frequently large so random variation may can be added to the cost estimate using experience. The preferred embodiment uses the experience to modify the morbidity to demographic ratio when the experience is worse than the upper bound of a large confidence interval (e.g., 90%).

An estimate of the variance of the group may be calculated as an additional pricing factor—greater variance implying greater risk and a higher price with all other factors being equal. The Lexian probability distribution can be used to calculate a confidence interval about the group or block's average expected rate of disability.

The Lexian distribution is somewhat more accurate than the binomial distribution which can be used as an alternative estimate. The confidence interval estimate from the Lexian distribution can be combined with the estimates of discounted cost and its variance from the regression model for the group for disability, providing an estimate of the total variance of the group's disability costs or a confidence interval of total expected claims costs. Larger ranges in expected cost imply a higher premium, all other factors being equal.

An alternative approach uses Monte Carlo simulation for estimating disability pricing rather than a regression analysis for the discounted cost estimate. A probability density function is fit to the discounted cost data with stratification by morbidity category and demographic strata. The Monte Carlo simulation will calculate numerous random samples for a group using that group's morbidity categories and demographic stratification. The incidence rate for an individual will be 0 or 1, selected randomly in proportion to the morbidity incidence for that person's morbidity category, age and gender strata. If it is 1 then the discounted cost is randomly selected from the probability density function for that morbidity category and demographic strata and added to the group's sum of expected claims costs. When zero is selected, a zero duration or cost estimate is added to the sum of the other peoples' estimates for that group. The expected discounted costs are summed for all people in the group. This process is repeated with random selections numerous times providing a distribution of expected discounted cost for the group. This is the preferred embodiment for calculating the distribution of total discounted cost probability for a group or block of business.

The final step in the product is offering the insurance coverage to the group or its agent at the modified premium (see box 510). Results (e.g., loss ratios, acceptance of the insurance coverage) should be tracked and can be used to modify the algorithms for future policy offerings and premium rate setting (see box 512).

From the foregoing, it will be observed that numerous modifications and variations can be effectuated without departing from the true spirit and scope of the novel concepts of the present invention. It is to be understood that no limitation with respect to the specific embodiment illustrated is intended or should be inferred.

The disclosure is intended to cover by the appended claims all such modifications as fall within the scope of the claims.

Each of the patents and articles cited herein is incorporated by reference as if fully set forth herein. The use of the article "a" or "an" is intended to include one or more.

The method described above can be directly applied to STD insurance using STD claim information rather than long term disability claim information. The exact same approach described within for long term disability can be applied for STD cost estimation and pricing, except that morbidity conditions will have different weights for long term disability vs. STD. The incidence model probabilities would be calculated using STD claims data files (rather than long term disability claims files) plus medical claims files. Alternative morbidity groupings could be developed to account for different medical conditions that may be more prevalent for STD than long term disability due to the difference in the length of the disability. The STD cost models would be calibrated using the STD claims data using the same methods as described for long term disability. Discounting will be less important since STD periods are short. The benefits of the present invention would likely be greater for long term disability since long term disability involves rarer and harder to predict events than STD.

APPENDIX 1

The following is an example of a SAS standardization program for LTD claims. The incoming data structures are converted to SAS and fields are mapped to variable names and standardized values. The universe is defined and the data can have continuance estimates appended for open cases as an estimate of the total duration. When each source is complete all files are concatenated into one file. A sample of the data cleaning and standardization from one source is listed also.

```
Data dat.GOOD_DATA dat.outofsel dat.badepdx dat.baddur;
Set incoming; **convert into days;
**original client field names will be mapped to TruRisk variable
names.
if MaxOfWAIT_UNIT eq 'D' then ep=MaxOfWAIT_PER;
if MaxOfWAIT_UNIT eq 'M' then ep=MaxOfWAIT_PER * 30;
if MaxOfWAIT_UNIT eq 'W' then ep=MaxOfWAIT_PER * 7;
length dx $6.; **rename client field to TR name;
dx=left(MaxOfMaxOfICD9_COD1);
claimno=claim_;*rename client variable;
sex=MaxOfSEX;
patdob=MaxOfBTH_DTE;drop MaxOfBTH_DTE;
begdate=MaxOfMinOfBEG_DTE;drop MaxOfMinOfBEG_DTE;
disdate=MaxOfOCC_DTE;
begdatenew=disdate + ep;***USING DIS DAT AND EP AS BEGINING
and open;
closedate=MaxOfCLS_DTE;drop MaxOfCLS_DTE;
opendate=begdatenew;
*Start to remove non-sense data and place in different datasets
for review;
if ep < 60 or (dx eq '' or dx eq '0' ) then output dat.badepdx;
**clean up diagnosis codes;
if dx in ( '' ,'0') then blankdx=1;
else blankdx=0;
locate=indexc(dx, '.');
length=length(dx);
if locate ne 4 and locate ne 0
then do;
if locate eq 2 then dx='00'||compress(dx,'.');
if locate eq 3 then dx='0'||compress(dx,'.');
end;
if length eq 2 & locate eq 0 & dx ne '' then
dx='0'||compress(dx);
if length eq 1 & locate eq 0 & dx ne '' then
dx='00'||compress(dx);
if locate in (4,0) then dx=compress(dx,'.');
opend=0;closed=0;
if closedate eq . then opend=1;
else closed=1;
ltdcases=1;**use for counting;
**set duration variables by days and months for closed ltd cases;
if closedate ne . then dur1day=(closedate-begdatenew);
else dur1day=0;
totdurday=dur1day;
**set duration using fixed date for opened cases for analysis
purposes;
if opend then totdurday=('01APR2004'd - begdatenew);
source='NAME OF CLIENT DATA;
**remove cases that are too new;
** or too old;
** or duration days lt 15;
** data ready for production is Good data;
IF OPENDATE GE '01JAN2000'D then output dat.outofsel;
else
IF OPENDATE lt '01JUL1994'D then output dat.outofsel;
else
if totdurday lt 15 then output dat.baddur;
else
output dat.GOOD_DATA;
format patdob begdate disdate opendate closedate begdatenew
yymmdd10.;
```

APPENDIX 2

A sample SAS read program for medical claims using TruRisk's standard layout is below(see Box 104). Each client may have a different layout so the read programs will vary. The medical data are validated and then standardized. A universe is defined and data from different sources are concatenated into one file for analytics. A sample read and standardization for one source follows.

```
libname dat '.';
%let tpa = SOURCE;
run;
filename filein ("medical080204.ic.clm");
run;
title "&tpa test claims";
run;
data dat.claims;
infile filein lrecl=400 pad;
length group $14. EmpID $11. depid $2. clmno $10.;
input
@1 Group $11.
@12 EmpID $18.
@30 DepID $3.
@33 Clmno $19.
@52 Clmline $5.
@57 servDate mmddyy8.
@67 paidDate mmddyy8.
@77 Charge 17.
@94 Allow 17.
@111 Deduct 17.
@128 Copay 17.
@145 Coins 17.
@162 Payment 17.
@179 PPOSave 17.
@196 dx1 $5.
@201 dx2 $5.
@206 dx3 $5.
@211 dx4 $5.
@216 dx5 $5.
@221 CPT $5.
@226 HCPCS $5.
@231 AdjFlg $2.
@233 OrgClmNum $19.
@252 OrgChrgNum $19.
@271 pos $5.
@276 notALLOW 17.
@294 COB 17.
;
*Create unique identifier for a person for each group;
length personid $14. ;
depid=translate(right(depid),'0','');
personid=compress(left(EmpID)||left(DepID));
if compress(clmtype) eq :**<<< select only medical;
format paiddate servdate mmddyy8.;
run;
**validate and standardize;
data dat.claims dat.baddates dat.badempids;
set dat.claims;
drop notallow pposave deduct;
allow=charge-notallow;
inelig=notallow;
discount=pposave;
deduct_c=sum(deduct,copay);
coins=.;
inpat=0;outpat=0;home=0;snf=0;urgent=0;er=0;ambsurg=0;
if compress(pos) in ('1','01','21','IH','I') then inpat=1;
if compress(pos) in ('2','02','22','OH') then outpat=1;
if compress(pos) in ('4','04','12','H') then home=1;
if compress(pos) in ('8','08','31','SNF') then SNF=1;
if compress(pos) in ('20') then URGENT=1;
if compress(pos) in ('23','ER','E') then ER=1;
if compress(pos) in ('24','ASC','B') then AMBSURG=1;
if servdate eq . or paiddate eq . then output dat.baddates;
else if empid eq '' or empid eq :'UNEXP' then output
dat.badempids;
else output dat.claims;
```

The invention claimed is:

1. A method of estimating the expected group disability insurance exposure for a policy period comprising:
    collecting medical claims data for the group to be underwritten, each medical claim being related to a particular member of the group;

providing morbidity categories that categorize medical claims, the morbidity categories relating diagnoses from medical claims that are generally homogeneous with respect to incidence of disability and expected duration or cost of disability;

categorizing with the morbidity categories each member's medical claims in the medical claims data to generate each member's morbidity categories;

providing a disability probability model for the likelihood of disability arising from each morbidity category during the policy period derived from the formula:

probability (disability occurring in the policy period given the morbidity category is present for the member)=probability (the morbidity category is present given all the disability claims in a historical disability claims database)*probability (disability in the policy period regardless of the morbidity category)/probability (morbidity category in medical claims);

applying the disability probability model to the member's morbidity categories for each member in the group to generate respective member's morbidity category probabilities of disability occurring in the policy period for each member in the group;

providing a statistical model to relate existing medical claims to future disability claim duration or cost to generate an expected duration or cost of disability arising from the morbidity categories during a policy period;

applying the statistical model to the member's morbidity categories present in the member's medical claims for each member in the group to generate respective member's morbidity category expected durations or costs for each member in the group;

combining for each member the member's morbidity category probability with the member's respective morbidity category expected duration or cost to generate members' expected disability exposures;

summing the members' expected disability exposures to form an expected group disability exposure; and offering group disability insurance coverage to the group.

2. The method of claim 1, wherein each medical claim has information about at least one medical diagnosis, and information on the age and gender of each member having medical claims in the group.

3. The method of claim 2, wherein the morbidity categories are age by gender strata by each medical diagnosis, and the age by gender strata are used to define the member disability exposures.

4. The method of claim 1, wherein for each member with multiple medical claims the members' disability exposures are adjusted for overlapping probabilities of the members' morbidity category probabilities.

5. The method of claim 1, wherein the disability claims are long term disability claims.

6. The method of claim 1, wherein the disability claims are short term disability claims.

* * * * *